(12) United States Patent
Harriman et al.

(10) Patent No.: US 12,461,487 B2
(45) Date of Patent: Nov. 4, 2025

(54) DIGITAL HOLOGRAPHIC MICROSCOPE

(71) Applicant: See-Through Scientific Limited, London (GB)

(72) Inventors: Oliver Harriman, London (GB); Irwin Zaid, London (GB)

(73) Assignee: SEE-THROUGH SCIENTIFIC LIMITED, London (GB)

( * ) Notice: Subject to any disclaimer, the term of this patent is extended or adjusted under 35 U.S.C. 154(b) by 725 days.

(21) Appl. No.: 17/776,884

(22) PCT Filed: Nov. 13, 2020

(86) PCT No.: PCT/EP2020/082061
§ 371 (c)(1),
(2) Date: May 13, 2022

(87) PCT Pub. No.: WO2021/094536
PCT Pub. Date: May 20, 2021

(65) Prior Publication Data
US 2022/0404765 A1    Dec. 22, 2022

(30) Foreign Application Priority Data
Nov. 15, 2019   (GB) ..................................... 1916705

(51) Int. Cl.
*G03H 1/00*    (2006.01)
*G02B 21/06*   (2006.01)
(Continued)

(52) U.S. Cl.
CPC .......... *G03H 1/0005* (2013.01); *G02B 21/06* (2013.01); *G02B 21/18* (2013.01); *G02B 21/26* (2013.01);
(Continued)

(58) Field of Classification Search
CPC .............. G03H 1/0005; G03H 1/2205; G03H 2001/005; G03H 2001/2234;
(Continued)

(56) References Cited

U.S. PATENT DOCUMENTS

2009/0091811 A1     4/2009  Asundi et al.
2014/0340476 A1*   11/2014  Sun ...................... G03H 1/0443
                                                            348/40
2019/0250392 A1*    8/2019  Cuche .................... G01B 9/021

FOREIGN PATENT DOCUMENTS

EP        2527928        11/2012
EP        2898310         5/2019
WO     2018211345        11/2018

OTHER PUBLICATIONS

International Search Report from related PCT Application No. PCT/EP2020/082061, dated Jan. 27, 2021, 13 pages.
(Continued)

*Primary Examiner* — Nathanael R Briggs
(74) *Attorney, Agent, or Firm* — Brooks, Cameron & Huebsch, PLLC

(57) ABSTRACT

The present invention relates to a system and method for digital holographic microscopy. According to an aspect of the invention there is provided an off-axis digital holographic microscope comprising: a light emitter configured to provide a divergent light beam; a sensor position to receive light from the light emitter in a first path and a second path, and thereby to detect a holographic image; a reflector positioned partially in the divergent light beam so that light that encounters the reflector extends towards the sensor in the first path, and light that does not encounter the reflector extends towards the sensor in the second path; and a support structure configured to support a sample in the first path or the second path.

8 Claims, 8 Drawing Sheets

(51) Int. Cl.
    *G02B 21/18* (2006.01)
    *G02B 21/26* (2006.01)
    *G03H 1/22* (2006.01)

(52) U.S. Cl.
    CPC ..... *G03H 1/2205* (2013.01); *G03H 2001/005* (2013.01); *G03H 2001/2234* (2013.01); *G03H 2223/18* (2013.01); *G03H 2223/24* (2013.01)

(58) Field of Classification Search
    CPC ........... G03H 2223/18; G03H 2223/24; G02B 21/06; G02B 21/18
    See application file for complete search history.

(56) References Cited

OTHER PUBLICATIONS

Search Report from related GB Application No. 1916705.5, dated May 15, 2020, 3 pages.

\* cited by examiner

DIGITAL HOLOGRAPHIC MICROSCOPE

The present invention relates to a system and method for digital holographic microscopy (DHM) that is particularly applicable for use in the in-line monitoring of biological cell expansion in bioreactors.

BACKGROUND

Bioreactors have been used in cell therapy development and manufacturing, such as in CAR T cell therapy expansion for cancer treatment. "Expansion" typically refers to the culturing to high density of a specific cell line ex vivo. During the process of expansion, it is necessary to periodically monitor concentration and viability of cells in the culture medium, "viable count". Ideally the culture parameters are adaptively controlled based on viable count and other measures, such that target cell density can be reached as quickly as possible and without negatively effecting batch quality. Typically, viable count involves extraction of a sample from a bioreactor by a technician, who then does the measurement on a separate instrument. This incurs labour costs and the risk of contamination and loss of the batch. Furthermore, there are limits to the frequency and repeatability of this off-line approach. The present invention is for the in-line and automated holographic imaging of cell cultures and general particle suspensions. "In-line" refers to the measurements being acquired on cells within a closed bioreactor system, so there is reduced possibility of associated contamination. The invention can be part of an automated process analytical technology, enabling cheaper, more frequent, and more reliable measurements.

The use of DHM for in-line cell monitoring presents many favourable characteristics. In DHM, a two-dimensional hologram is recorded on a digital image sensor. Then, with information of the sample illumination, a three-dimensional image of the sample can be numerically reconstructed. Unlike in a conventional image acquired at a single focal plane, in a single hologram information is gathered on particles at a continuum of focal planes. This means in a single hologram all freely moving particles in a volume can be imaged, without risk of double-capture. The three-dimensional morphological information on each cell can be used to reliably count and measure cells, distinguish single cells from cell clusters, and identify foreign particles. Furthermore, DHM provides quantitative phase information as well as intensity information. This means for example that an otherwise transparent cell could be distinguished from the surrounding medium by its distinct refractive index. Refractive index has been used to infer cell viability and this is valuable as no labelling technique or reagent is required. Computer vision algorithms can be applied to holograms or reconstructed images to efficiently produce statistics on large populations of cells. By passing light through a sample of cell culture, DHM is able to provide holographic images and allow effective analysis of sampled cells in a non-invasive way. Known digital holographic microscopes can also be bulky and difficult to integrate with bioreactors. An object of the invention is to provide a system and method for DHM that can be readily incorporated or retrofitted in bioreactors. The invention can also be applied in other laboratory instruments, for example, in devices for cell enrichment and isolation.

SUMMARY

According to the present invention there is provided an off-axis digital holographic microscope, comprising: a light emitter configured to provide a divergent light beam; a sensor positioned to receive light from the light emitter in a first path and a second path, and thereby to detect a holographic image; a reflector positioned partially in the divergent light beam so that light that encounters the reflector extends towards the sensor in the first path, and light that does not encounter the reflector extends towards the sensor in the second path; and a support structure configured to support a sample in the first path or the second path.

In this way, an effective and robust off-axis digital holographic microscope can be produced with very few parts. This is advantageous because it can be produced simply and cost effectively. A further advantage is achieved because the reflector can be positioned very close to the light emitter, which produces a small overall size. This allows the sample to be positioned very close to the sensor, achieving a high numerical aperture, while still enabling off-axis illumination.

The compact size can improve its mechanical and thermal stability. The first and second paths can be small in length and the reflector can be fixed in position relative to the light emitter to reduce undesirable effects due to mechanical vibrations and to enable simple alignment.

Preferably the light emitter is a laser diode. Laser diodes typically have a relatively long coherence length which makes them well suited for off-axis digital holography.

In an alternative configuration the light emitter may be a LED. These typically have a much shorter coherence length, and this may necessitate some structural changes to the microscope, relative to a laser diode, such as the addition of a transparent element of elevated refractive index in at least one of the first and second paths.

Preferably the reflector and the sensor are provided in the plane of the fast-axis of the laser diode. The fast-axis of the laser diode generally has a greater divergence than the slow-axis. It is generally desirable for the present application to provide a coherent light source with a high divergence angle as this provides more space for positioning the reflector partially within the divergent beam, and providing light evenly in the first and second paths.

Preferably the reflector is positioned within the full-width at half maximum of the divergent light beam. In this way, the relative brightness of light in the first and second paths can be controlled. In a preferred arrangement the reflector may be positioned so that the brightness of the first and second paths is substantially similar.

Preferably the distance between the reflector and the light emitter is smaller than the distance between the light emitter and the sensor. Preferably the distance between the reflector and the light emitter is smaller than the distance between the reflector and the sensor. In this way the footprint, or overall size, of the microscope can be more compact whilst effectively utilising the incident light from the light emitter. Decreasing the distance from the sample to the sensor can also improve the resolution of the holographic images.

Preferably the off-axis digital holographic microscope further comprises a transparent element with a refractive index that is greater than one and which is positioned in the first path or the second path to equalise the optical path lengths of the first and second paths. The transparent element preferably has an elevated high refractive index relative to the surrounding medium, which is typically air. A transparent element of high refractive index may be particularly useful when a light emitter such as a LED is used with a relatively short coherence length. In such a situation it may be particularly important to match the optical path lengths of the first and second paths.

Of course, the transparent element may be provided partially in the first path and the second path, and the relative length of the transparent element in the respective paths may be selected to equalise the optical path lengths.

Preferably the support structure is provided in the transparent element, and the reflector may also be provided in the transparent element. In this way the support structure, or sample housing, can be integrated with the transparent element and/or reflector which may helpfully reduce the number of components that are required, further increasing the robustness of the microscope and decreasing the unit cost.

Preferably the reflector comprises a metallised or coated surface. The reflector preferably has a high reflectivity and this may be provided by using a mirror coating, such as a metallised coating.

Preferably the reflector reflects light towards the sensor in the first path by total internal reflection. In embodiments the light may be totally internally reflected within the transparent element with a refractive index that is greater than one.

According to another aspect of the invention there is provided a method of performing digital holographic microscopy, comprising the steps of: emitting light from a light emitter to provide a divergent light beam; providing a reflector partially in the divergent light beam so that light that encounters the reflector extends towards a sensor in a first path, and light that does not encounter the reflector extends towards the sensor in a second path; supporting a sample in a support structure in the first path or the second path; and receiving light at a sensor from the first path and the second path, and thereby detecting a holographic image.

According to another aspect of the invention there is provided a digital holographic microscope, comprising: a light emitter configured to provide a light beam; a sample chamber in fluid communication with a bioreactor, wherein the sample chamber is configured to receive a biological sample from the bioreactor so that the biological sample is positioned in the light beam; a sensor positioned to receive light from the light emitter that has passed through the sample chamber, and thereby to detect a holographic image; a reflector having at least one reflective surface which is angled relative to the incident light from the light emitter, wherein the reflector is positioned to reflect the light beam from the light emitter towards the sensor, and the light emitter and the sensor are provided on a first side of the sample chamber whereas the bioreactor is provided on a second side of the bioreactor.

In this way, it is possible to obtain a holographic image of a sample in real-time in a bioreactor. This technique enables a holographic image of the inside of a bioreactor. This offers significant advantages in a laboratory because samples can be analysed without interrupting the operation of the bioreactor, and without requiring a technician to obtain a sample.

Providing an angled reflection surface allows reflected light to extend towards the sensor in a direction that is different to the direction of incident light from the light emitter. This allows light to be directed towards the sensor along a different path. This enables the sensor to be positioned on the same side of the bioreactor as the light emitter while ensuring that the same particle is not imaged twice in the sample chamber.

The digital holographic microscope may be an in-line digital holographic microscope. In this way, the object beam and the reference beam can follow the same optical path. The holographic image can be formed due to interference between the object beam which encounters a particle in the sample chamber and the reference beam which does not.

The digital holographic microscope may be an off-axis digital holographic microscope. In this design the digital holographic microscope preferably includes a further reflector for reflecting a first beam towards the sensor at a different angle to a second beam. Generally the reflected beam is used as a reference beam and the direct beam is used as the object beam (although this need not be the case, and the reflected beam could equally be used as the object beam while the direct beam is used as the reference beam).

The further reflector may be positioned partially in a divergent light beam from the light emitter so that light that encounters the further reflector extends towards the sensor in a first path, and light that does not encounter the reflector extends towards the sensor in a second path. Alternatively, a beam splitter may be used to separate light from the light beam into an object beam and a reference beam.

Preferably the reflector comprises at least two reflective surfaces. In this way light passing through the sample chamber can be displaced or reoriented such that the reflected light is directed back toward the sensor on the first side of the sample chamber.

Preferably the reflector is a prism. In this way, the reflector can reflect the light from the light emitter towards the sensor along a different, but preferably parallel path. This is important so that the light does not pass through the same portion of the sample twice; it is desirable to avoid this kind of double-pass because it may involve imaging the same particle twice which would corrupt the reliability of measurements. In some embodiments the light beam may pass through the sample chamber twice, but preferably these would be two non-overlapping portions of the same sample chamber, or two distinct sample chambers so that there is no possibility of imaging the same particle twice.

The prism clearly has a physical size and, where it is used, it will project into the interior of the bioreactor. For this reason prisms present a viable solution where the bioreactor is sufficiently large to accommodate the prism. The prism is preferably a transparent and solid object, which may be made of glass. A triangular prism may be used in some embodiments. In an alternative a corner cube reflector may be provided.

Preferably the prism comprises a cut-out in which the sample chamber is located. The prism can be placed in the bioreactor and the biological sample can flow into the sample chamber in the cut-out of the prism. This can allow in-line imaging of the biological sample.

In some embodiments there may be more than one cut-out in the prism, defining respective sample chambers. This can allow the beam to pass through multiple sample chambers between the light emitter and the sensor. The sample chambers are preferably arranged to ensure that the beam cannot encounter the same particle twice in the optical path from the light emitter to the sensor.

Preferably the reflector is a prism and the prism comprises a cut-out in which the sample chamber is located, wherein the cut-out is located in the path of the object beam of the off-axis digital holographic microscope and the cut-out is not located in the path of the reference beam. In this way, the reference beam can interfere with the object beam at the sensor to record a holographic image. This means that the cut-out must be positioned carefully with respect to the light emitter and the sensor so that it is in the optical path of the object beam, but is outside the optical path of the reference beam.

The sample chamber may be provided in a flow path from the bioreactor, and the flow path may have a shape that is selected so that the light beam encounters the sample only once in the optical path from the light emitter to the sensor. For example, the flow path may comprise a chicane or bend to position the sample chamber so that it is intersected only once by the optical path.

The sample chamber may be positioned so that it is intersected by the light beam before it is reflected by the reflector. In other embodiments the sample chamber may be intersected by the light beam after it has been reflected by the reflector. In arrangements where the reflector comprises at least two reflective surfaces the sample chamber may be positioned to intersect the light beam between reflections by the reflector.

Preferably the reflector comprises a single reflective surface which is angled relative to the incident light from the light emitter. This arrangement may be desirable where there is limited space behind the sample chamber in the bioreactor. Such a situation may arise where the sample chamber is provided in a flow channel, and it is desirable that the reflector does not project far beyond the sample chamber.

Preferably the digital holographic microscope further comprises a prism that is positioned between the light emitter and the single reflective surface, wherein the light emitter is configured to project the light beam into the prism. This can allow light to be coupled from the light emitted to the sensor, via the reflector and the sample with high efficiency. The prism prevents loss of light within the system due to undesirable reflections. The prism is preferably optically connected to the sample chamber so that there is no loss of light due to reflections between the prism and the sample chamber. This may be achieved through index matching where the prism and the sample chamber are separate components; for example through the use of an immersion oil or some other index matched material. Alternatively, the sample chamber may be provided within the prism so that no index matching is required.

Preferably the reflector is provided by a surface of the prism. For example, the reflector may be provided by total internal reflection on a surface of the prism. The surface of the prism may be coated or metallised to improve reflective efficiency, where necessary.

Preferably the single reflective surface is separated from the sample chamber, so that the reflected beam is non-overlapping with the incident beam. In this way the risk of light passing twice through the same region of a sample can be mitigated. The separation distance may be selected based on the width of the light beam.

A broader incident beam may require a larger separation distance to ensure that light rays on extreme sides of the beam do not intersect one another in the sample chamber. This ensures that the incident and reflected light beams are non-overlapping in the sample chamber so that the same particle is not imaged twice, thereby corrupting the measurement.

According to another aspect of the invention there is provided a method of performing digital holographic microscopy, comprising the steps of: emitting a light beam from a light emitter; providing a sample chamber in fluid communication with a bioreactor, wherein the sample chamber is configured to receive a biological sample from the bioreactor so that the biological sample is positioned in the light beam; positioning a sensor to receive light from the light emitter that has passed through the sample chamber, and thereby detecting a holographic image; providing a reflector having at least one reflective surface which is angled relative to the incident light from the light emitter, wherein the reflector is positioned to reflect the light beam from the light emitter towards the sensor, and the light emitter and the sensor are provided on a first side of the sample chamber whereas the bioreactor is provided on a second side of the bioreactor.

According to another aspect of the invention there is provided a probe for use in a digital holographic microscope, the probe comprising: a sample chamber configured to be provided in fluid communication with a bioreactor, wherein the sample chamber is configured to receive a biological sample from the bioreactor so that the biological sample is positioned in a light beam received from a light emitter in the digital holographic microscope; and a reflector having at least one reflective surface which is angled relative to the incident light from the light emitter, wherein the reflector is positioned to reflect the light beam from the light emitter towards a sensor. The probe may be disposable or a single use consumable. This eliminates the risk of sample contamination. It may be possible to autoclave a probe.

Preferably the reflector is a prism having at least two reflective surfaces. In this way light passing through the sample chamber can be displaced or reoriented such that the reflected light is directed back toward the sensor on the first side of the sample chamber.

Preferably the prism comprises a cut-out in which the sample chamber is located. In this way the prism can be integrated with the sample chamber which may helpfully reduce the number of components that are required, further increasing the robustness of the microscope and decreasing the unit cost of a probe.

The cut-out may be positioned in the path of the object beam of an off-axis digital holographic microscope and an optical path is provided in the prism for the reference beam that does not intersect the cut-out.

Preferably the probe further comprises a prism having a surface that is angled so that light can be projected into the prism by the light emitter. The reflective surface may be provided by a surface of the prism.

Preferably the reflective surface is separated from the sample chamber, so that the reflected beam is non-overlapping with the incident beam. Preferably the separation distance is selected based on the width of the light beam.

According to another aspect of the invention there is provided a bioreactor comprising a probe as previously defined and a volume for holding a biological liquid sample in fluid communication with the sample chamber of the probe. The bioreactor may also include a digital holographic microscope comprising the light emitter and the sensor.

BRIEF DESCRIPTION OF THE FIGURES

Embodiments of the invention are now described, by way of example, with reference to the drawings, in which.

DETAILED DESCRIPTION

Figure 1A:
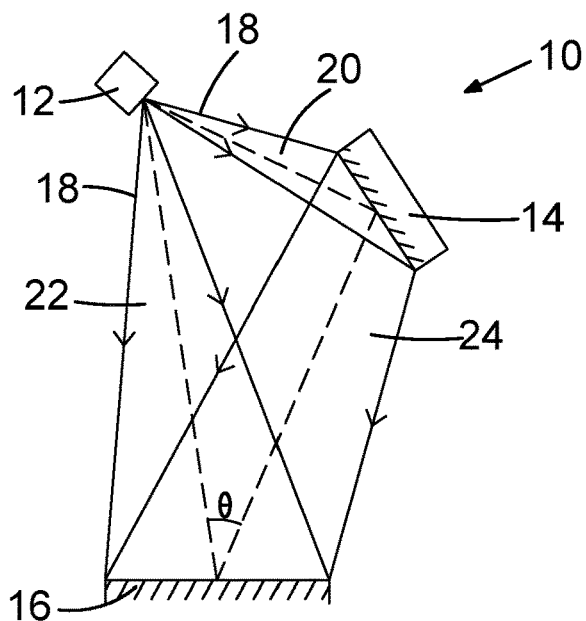
FIG. 1A is a schematic side view of an off-axis digital holographic microscope in a first embodiment of the invention.
Figure 1B:
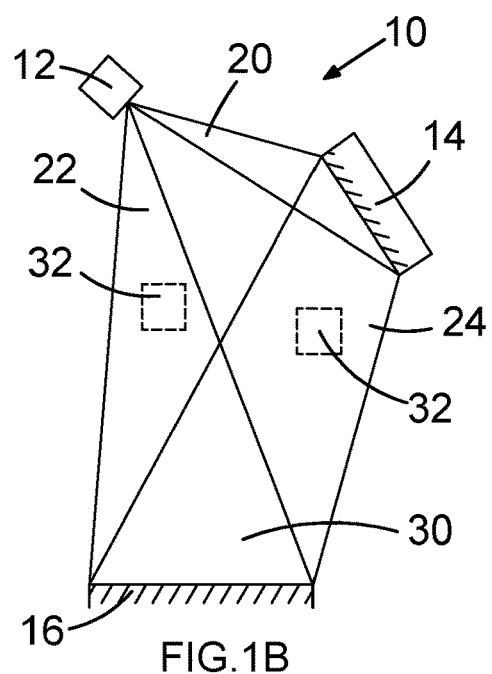
FIG. 1B is another schematic side view of the off-axis digital holographic microscope in the first embodiment of the invention.

FIGS. 1A and 1B show schematic side views of an off-axis digital holographic microscope 10 in an embodiment of the invention. The microscope 10 includes a light source 12, a reflector 14 and a light sensor 16, where the light source or emitter 12 provides a divergent light beam 18 that is partially incident on the reflector 14 and partially incident on the sensor 16. By this we mean that a first light portion 20 of the divergent light beam 18 is incident on the reflector 14 and a second light portion 22 is incident on the sensor 16.

In this embodiment the distance between the light source 12 and the sensor 16 is greater than the distance between the reflector 14 and the sensor 16. In addition the distance between the light source 12 and the reflector 14 is less than the distance between the reflector 14 and the sensor 16. Of course it should be understood that the relative distances and positions between a light source, reflector and sensor can be controlled based on the degree of divergence of the divergent light beam. For example the distance between a light source and a reflector can be greater than the distance between the reflector and a sensor.

The reflector 14 is angled relative to the light source 12 such that the first light portion 20 is reflected to provide a reflected light portion 24. The reflected light portion 24 is directed toward the sensor 16. To maximise the effective use of the divergent light beam 18 the sensor 16 is positioned to face both the light source 12 and the reflector 14 such that the central region of the second light portion 22 and central region of the reflected light portion 24 are substantially incident on a central portion of the sensor 16. The precise position of orientation of the reflector 14 is tuned to control the angle ⊖ between the incident reflected light portion 24 and the incident second light portion 22 such that both light portions strike pixels of the light sensor 16. The angle ⊖ can be controlled to determine the spatial frequency of an interference pattern across the pixels of the sensor 16, thereby controlling the resolution of a digital holographic image. It is possible to further configure the shape of the reflector 14 such that the reflected light portion 24 is collimated if desired.

Figure 1C:
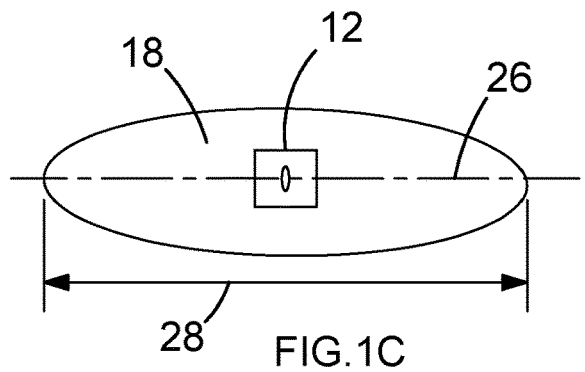
FIG. 1C is a schematic face-on view of a light beam from a laser diode.

The relative positions of the light source 12, the reflector 14 and the light sensor 16 are chosen to make use of the divergent light beam 18. FIG. 1C shows a schematic face-on view of the light source 12, e.g. a broad area laser diode, and the divergent light beam 18. It should be understood that reflector 14 and the light sensor 16 are positioned in the plane of high divergence of the light beam 18, for example in the plane of the fast-axis direction of a broad area laser diode. In other words the reflector 14 and the sensor 16 are angularly displaced from the light source 12 while each being substantially within the full width at half maximum 28 (FWHM) of the angular range of the divergent light beam 18. It is also possible for only a portion of the reflector 14 and/or only a portion the sensor 16 to be within the FWHM of the divergent light beam 18, and it should be understood that a holographic image can be constructed accordingly. In other words part of the reflector 14 and/or sensor 16 may be outside the FWHM of the divergent light beam 18 for the DHM to operate effectively.

The second light portion 22 overlaps, or intersects, the reflected light portion 24 to form an overlap region 30 before the two light portions strike the light sensor 16. A sample 32 to be imaged is positioned in the microscope 10 in the field of the second light portion 22 or the reflected light portion 24 outside of the overlap region 30. This means that only one incident light component, the second light portion 22 of the divergent light beam 18 or the reflected light portion 24 impinges on the sample 32 before it strikes the light sensor 16 below. The light portion within which the sample 32 is placed is called the object beam and the other light portion is called the reference beam. The light information from the object beam and the reference beam is then used to construct a digital holographic image since the object beam includes light information caused by the interference of incident light by the sample. By providing the sample 32 closer to the light sensor 16 (and outside of the overlap region 30) the resolution of a holographic image can be improved due to a higher numeral aperture. The relative distances from the light source 12 to the sample 32 and the light source 12 to the sensor 16 can also be controlled to effect hologram magnification at the sensor 16.

Figure 2:
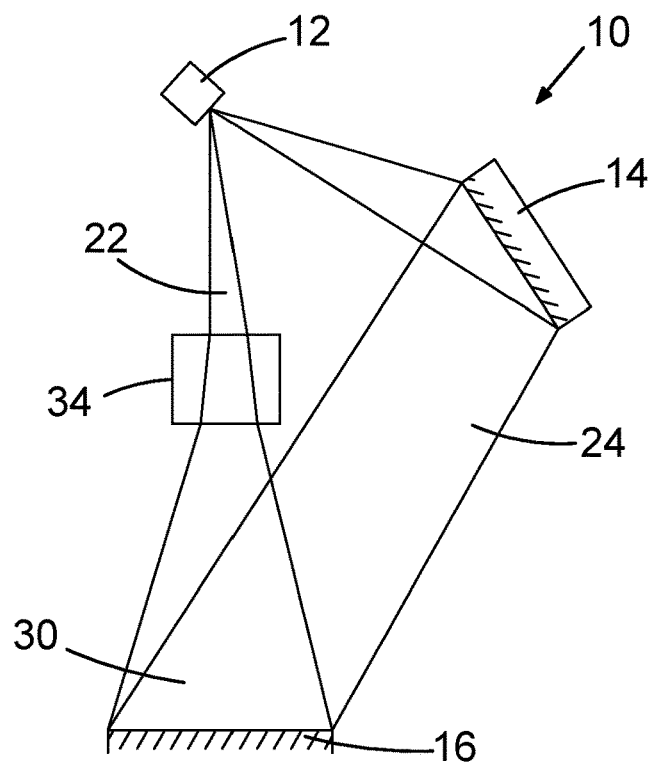
FIG. 2 is a schematic side view of another off-axis digital holographic microscope in another embodiment of the invention.

FIG. 2 shows a schematic side view of the off-axis digital microscope 10 further comprising a high refractive index component 34. The high refractive index component 34 is positioned in the path of the second light portion 22 (before the overlap region 30).

The high refractive index component 34 is used to equalise the optical path lengths of the second light portion 22 and the reflected light portion 24 and is dependent on the coherence length of the divergent light beam 18. It should be understood that the refractive index of the component 34 would be greater than the refractive index of the surrounding medium (typically air).

Figure 3:
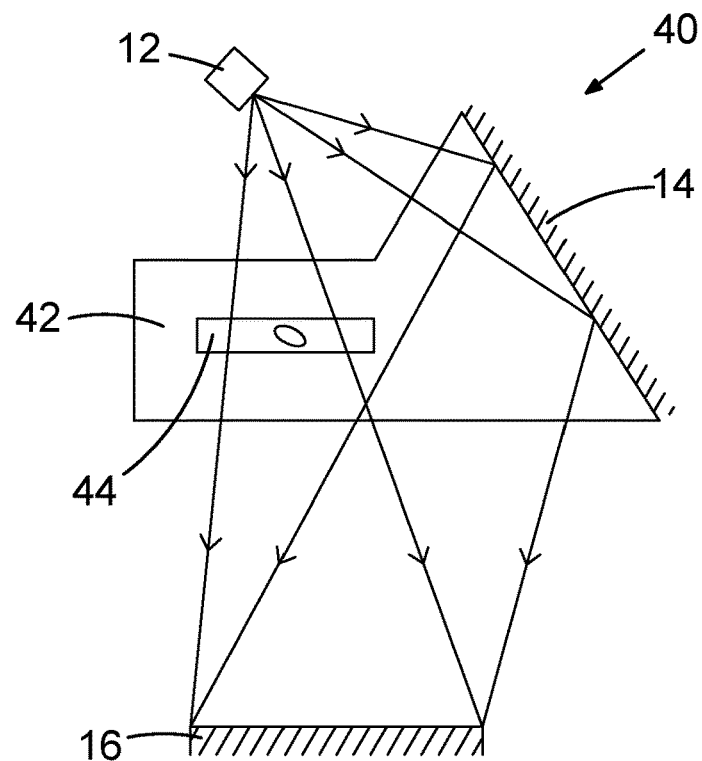
FIG. 3 is a schematic side view of another off-axis digital holographic microscope in another embodiment of the invention.

FIG. 3 shows another embodiment of an off-axis digital microscope 40 where the microscope 14 comprises an integrated reflector housing 42. The integrated reflector housing 42 integrates the reflector 14 in the housing 42 as well as a sample chamber 44. The housing 42 can be made of a material having a high refractive index, as will be appreciated by a person skilled in the art. Similarly, a skilled person will also be aware of different reflectors in the art. Examples of the reflector 14 in the above embodiments may include a metallised surface or an transparent material that exhibits total internal reflection (TIR) against the incident first light portion 20.

Figure 4A:
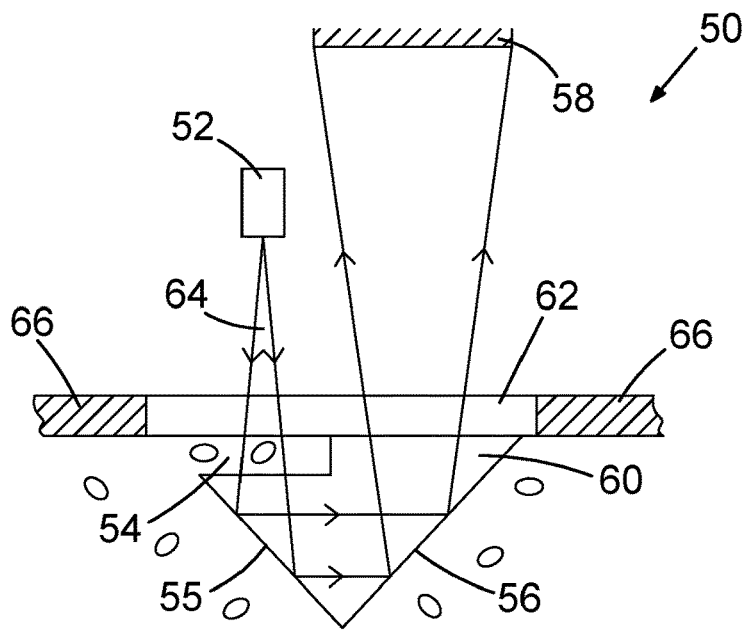
FIG. 4A is a schematic side view of another digital holographic microscope according to the invention.

FIG. 4A shows a schematic side view of a digital holographic microscope 50 arrangement in another embodiment of the invention. The microscope 50 comprises a light source 52, a sample chamber 54, first and second reflectors 55, 56 and a light sensor 58. The sample chamber 54 and the reflectors 55, 56 are integrated into a single triangular prism-shaped probe 60. The light source 52 is preferably a laser diode having a divergent light beam, although it is also possible to use alternative light sources such as LEDs.

The sample chamber 54 is a cut-out section in the body of the probe 60. The cut-out is in fluid communication with a sample volume in a bioreactor so that biological material can flow into the cut-out section 54 to be imaged. The probe 60 also has a flat top surface 62 such that in a triangular prism the top surface 62, the first reflector 55 and the second reflector 56 form the three rectangular surfaces of the prism. The sample chamber 54 is positioned below the top surface 62 and along the side of the first reflector 55, and the cut-out section penetrates inwardly into the body of the probe 60 parallel to the top surface 62 to a predetermined depth.

The top surface 62 is transparent and allows a light beam 64 from the light source 52 to pass through the top surface 62 and into the sample chamber 54. In FIG. 4A the light beam 64 is divergent, but it should be understood that another type of illumination such as a collimated light beam from a gas laser or collimated LED light source may also be used.

After passing through the sample chamber 54, the light beam 64 re-enters the body of the probe 60 and is subsequently reflected by the first and second reflectors 55, 56 and directed back toward the top surface 62, where the light beam 64 exits the probe 60 through the top surface 62 and strikes the light sensor 58. In this way, light can be reflected back towards the sensor 58 in a direction that is generally parallel to the direction in which the light beam 64 is emitted by the light emitter 52. The displacement between the lower surface of the sample chamber 54 and the first reflector 55, and the lateral displacement between the first and second reflectors 55, 56 ensure that light only passes through the sample chamber 54 once. It should therefore also be understood that the depth of the sample chamber 54 is controlled such that light reflected by the first and second reflectors 55, 56 pass only through the body of the probe 60 before exits through the top surface 62. Note that alternatively the sample chamber 54 can be arranged in the probe 60 such that the light beam 64 passes through a sample after the light beam 64 has been reflected from the internal reflector surfaces 55, 56. Importantly the sample chamber 54 is arranged in the probe 60 such that light only passes through one part or region of a sample in the chamber once.

The light source 52 and the light sensor 58 are positioned on the same side of the probe 60. This means that the light beam 64 from the light source 52 enters and exits the probe 60 via its top surface 62 where it is collected by the light sensor 58. Therefore the digital holographic microscope 50 uses reflection to allow illumination and imaging from the same side of a sample, unlike typical transmission imaging techniques.

The probe 60 is attached to a vessel such that the top surface 62 is in line with, or forms a part of, a wall 66 of the vessel. In this way the top surface 62 of the probe 60 acts like a window to the vessel for imaging light to pass in and out of the vessel. The vessel may be a bioreactor for example. The probe 60 can therefore be fitted within a window of the bioreactor to allow inspection and imaging of the biological contents within. In certain embodiments the probe 60 may be an integrated component of the bioreactor.

In this embodiment the prism-shaped probe 60 is arranged to project into the bioreactor from the top surface 62/vessel wall 66 such that the sample chamber 54 (i.e. the cut-out section in the probe 60) is in fluid communication with the interior space of the vessel. This means that the fluid in the vessel can readily flow in and out of the space of the sample chamber 54, where the volume of fluid within the sample chamber 54 can be imaged by the digital holographic microscope 50.

The digital holographic microscope 50 may be provided in an enclosure or structure (not shown) which at least partially surrounds one or more components of the DHM 50. For example panels or layers may be arranged around the DHM 50 to provide the enclosure. The enclosure is configured to protect the optics components, such as the light source 52 and sensor 58, and/or the sample from physical damage or to prevent external light from entering the DHM 50. The enclosure may also be configured to provide the DHM in a lower refractive index medium to allow total internal reflection from the reflector surfaces 55, 56 of the probe 60.

Figure 4B:
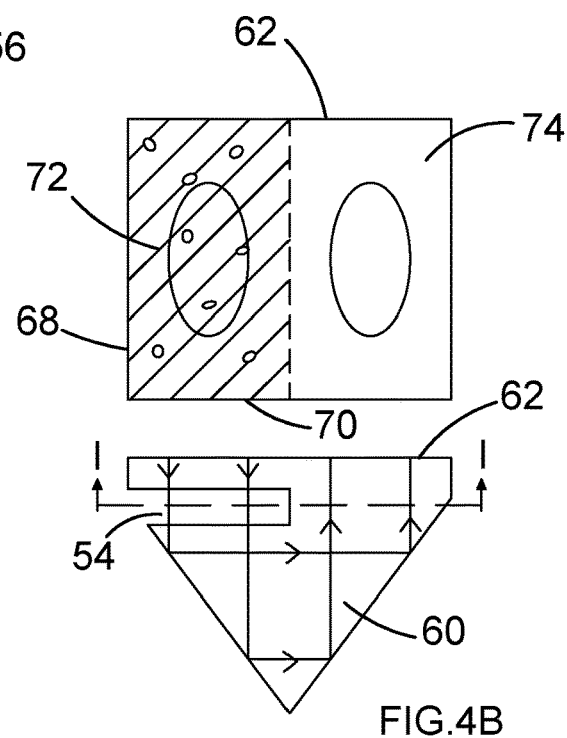
FIG. 4B is a schematic top view and corresponding side view of a sample chamber of an in-line digital holographic microscope in another embodiment of the invention.
Figure 4C:
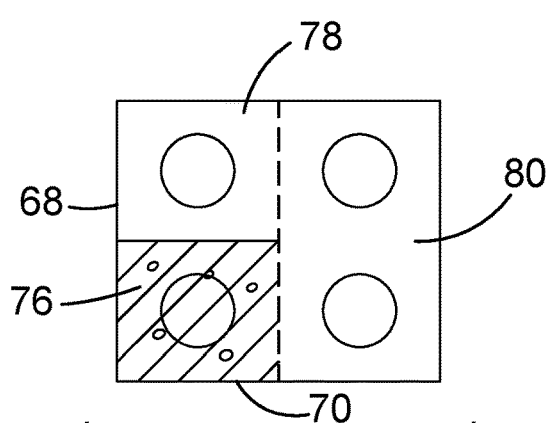
FIG. 4C is a schematic top view and corresponding side view of a sample chamber of an off-axis digital holographic microscope in another embodiment of the invention.
Figure 4C:
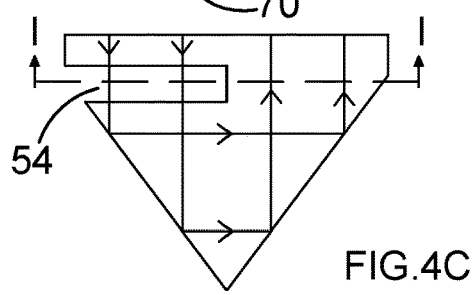

The digital holographic microscope 50 can be used as an in-line DHM or an off-axis DHM based on the shape of the sample chamber 54. FIGS. 4B and 4C show schematic top views and corresponding side views of a probe used for in-line DHM and off-axis DHM respectively. The top views are the view from the top surface 62 of the probe, along cross-sectional line I-I in the corresponding side views.

In FIG. 4B the sample chamber 54, fully extends across a full side 68 of the first reflector, below the top surface 62. The sample chamber 54 extends to approximately half of the depth 70 of the probe 60 (parallel to the top surface 62). In other words, approximately half of the probe 60 along the plane of the sample chamber 54 is a cut-out. This means that, in use, the entire area of the incident light beam 64 passes through a cut-out section 72 (i.e. the top cross-section of the sample chamber 54) and is reflected back out of the probe 60 through a solid section 74. An in-line holographic image is constructed by using interference patterns created by light that is scattered by/from objects 76 in the sample chamber 54 and reference light that is not scattered by/from the same objects 76.

In FIG. 4C the sample chamber 54 is a rectangle-shaped notch in one corner of the probe 60. It has a length that extends across approximately one-half of each side of the probe 60. In other words, approximately a quarter of the probe 60, by area, along the plane of the sample chamber 54 is a cut-out. This means that, in use, half of the incident light beam 64 passes through a cut-out section 76 (i.e. the top cross-section of the sample chamber 54) and the other half of the incident light beam 64 passes through an incident solid section 78, where the incident light that passes through the cut-out section 76 (into the sample chamber 54) forms the object beam and the incident light that passes through the incident solid section 78 forms the reference beam. The object and reference beams are then each reflected in the probe 60 back up toward the top surface 62 and exits the probe through an exit solid section 80 of the probe 60. Therefore an off-axis holographic image is constructed by using the separate object and reference beams that into and out of the probe 60. In this way, the probe 60 can provide separate optical paths for the object and reference beams. The object beam can pass once through the cut-out section 76 before or after it is reflected and directed towards the sensor through the exit solid section 80. The reference beam can pass through the incident solid section 78 before being reflected and directed back towards the sensor through the exit solid section 80.

Figure 5:
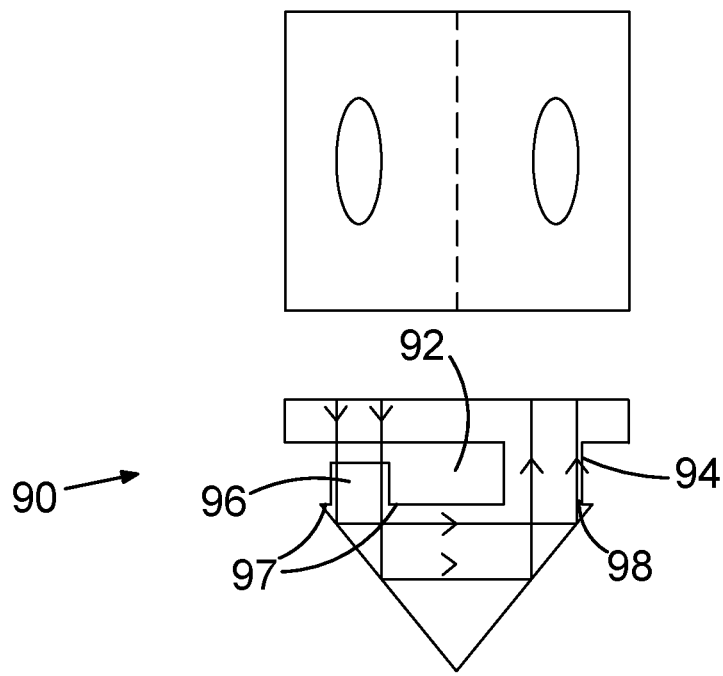
FIG. 5 is a schematic top view and corresponding side view of a sample chamber for an in-line digital holographic microscope in another embodiment of the invention.
Figure 6:
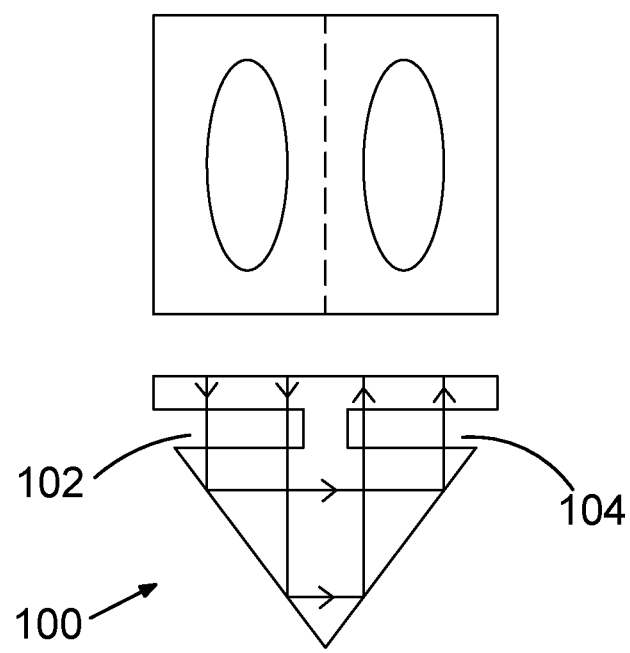
FIG. 6 is a schematic top view and corresponding side view of another sample chamber for an in-line digital holographic microscope in another embodiment of the invention.

FIGS. 5 and 6 show schematic top and side views of alternative probes in accordance with the invention. The figures show probes set up for in-line digital holography. However it should be understood that the sample chambers/cut out sections in the probes can be shaped accordingly for an in-line or an off-axis digital holographic microscope.

FIG. 5 shows a probe 90 having a first cut-out section 92 and a second cut-out section 94. The first cut-out section 92 has an inward projection 96, where incident light is directed into the probe 90 via its top surface, in line with the inward projection 96. The projection 96 is shaped according to design and operational requirements in order to reduce the depth of the imaging volume. In other words the object beam can only image biological material that is in the small space between the inward projection 96 and the top surface of the first cut-out section 92 (i.e. the imaging region). This can allow imaging of a reduced number of biological objects. The projection 96 is directed into the first cut-out section 92 such that the bottom surface 97 of the first cut-out section forms an open volume that surrounds the projection 96. Providing the open volume around the projection 96 allows particles to more readily enter and exit the imaging region. The object beam is reflected in the probe 90 and directed up toward the top surface via a channel 98 in the probe. It should be understood that the dimensions of the first cut-out section 92 and the second cut-out section 94 are determined by the required dimensions of the projection 96 and the channel 98.

FIG. 6 shows a probe 100 having a first cut-out section 102 and a second cut-out section 104, where both cut-out sections 102, 104 are configured to allow fluid communication with the fluid in a bioreactor vessel. In other words, the first and second cut-out sections 102, 104 both act as sample chambers. It should be understood that two sample chambers can be provided since the fluid sample in each of the sample chambers will be different. Therefore no part of a sample would be imaged twice.

Figure 7:
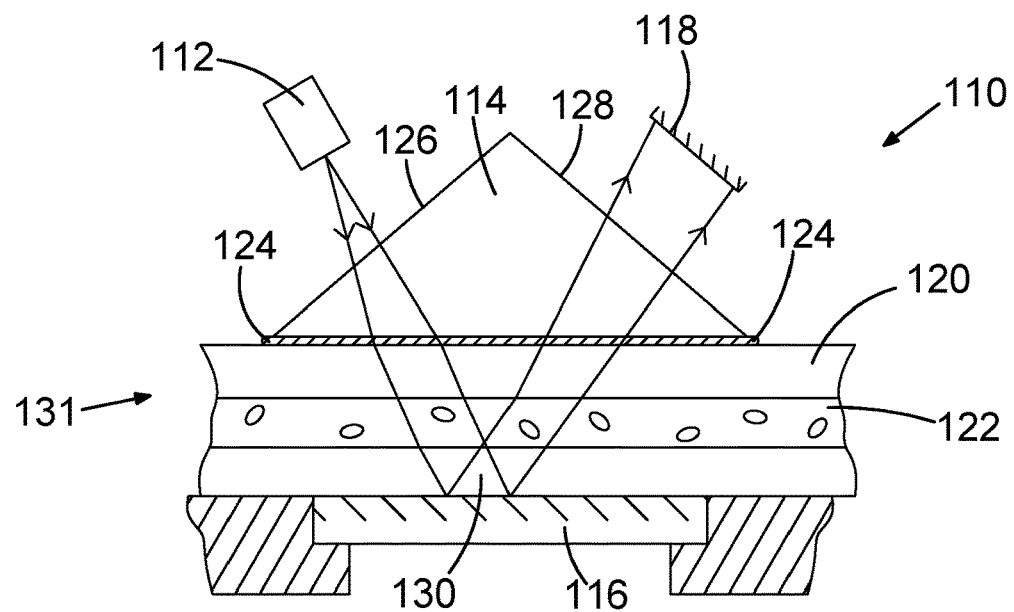
FIG. 7 is a schematic side view of another digital holographic microscope according to the invention.

FIG. 7 shows a digital holographic microscope 110 arrangement in another embodiment of the invention. The microscope 110 comprises a light source 112, a prism 114, a reflector 116 and a light sensor 118. The microscope 110 is arranged around a flowcell 120, where the light source 112, prism 114 and light sensor 118 are positioned on a first side of the flowcell 120 and the reflector 116 is positioned on a second side of the flowcell 120. The flowcell 120 is configured to direct a channel 122 of sample fluid in and out of an adjoining vessel, such as a bioreactor, and has a transparent section to allow for entry and exit of light (i.e. for holographic imaging).

The prism 114 is bonded onto the first side of the transparent section on the first side of the flowcell 120 using an immersion oil 124 or optical adhesive that is an index-matched material with the transparent section, thereby optically coupling the prism 114 to the flowcell 120. The reflector 116 is positioned on the second side of the flowcell 120, parallel to the channel 122 (and parallel to the bonded surface of the prism 114).

Importantly the precise positon or registration of the prism 114 relative to the light source 112 and the light sensor 118 must be known to ensure that the light information is correctly processed to form a holographic image.

The prism 114 is triangular and is optically smooth on an incident light surface 126 such that light from the light source 112 is able to enter the prism 114 and be carried into the optically coupled flowcell 120. The incident light surface 126 is substantially normal, or close to normal, to the incident light received from the light source 112 such that transmission is maximised and reflection of the light is minimised.

As light passes through the channel 120 toward the second side of the flowcell 120 and the reflector 116, it is reflected at an angle back through the channel 122 and the prism 114. It should be understood that the reflector 116 is a flat plane and lateral deflection of the incident light is achieved by providing the light to the reflector 116 at an angle. The light then exits the prism 114 through an exit surface 128 of the probe 114 and is captured by the light sensor 118.

The reflector 116 is positioned at a separation distance from the channel 122 that is at least the same as the width of the incident light beam that passes through the channel 122. This ensures that any reflected light that overlaps the incident light, i.e. overlap region 130, is not within the channel 122. It is possible to position the reflector 116 within the incident beam width, but it should be understood that this increases the risk of double imaging a same part of the sample.

A skilled person will be aware of suitable reflectors in the art. Examples of the reflector 116 may include a metallised surface (e.g. an aluminised surface on a sheet of transparent glass) or an acrylic material (e.g. PMMA) that exhibits total internal reflection (TIR) against the incident first light portion 20. In known bioreactor and flowcell arrangements there is limited space in between the flowcell and the bioreactor wall. Therefore a flat reflector can be easily incorporated into existing setups. It is possible to use a prism shaped reflector if the space permits, which means that the incident light can be provided normal to a top surface of the prism and be laterally displaced within the prism.

In this example embodiment a probe 131 can be provided, which includes the flowcell 120, the channel 122 and the reflector 116. The probe 131 can be attached to, or part of, the bioreactor so that biological material can flow through the channel 122 to be imaged. The DHM 110 can be provided separately to the probe 131. Thus, the bioreactor can be provided together with the probe 131 and then the DHM 110 can be positioned relative to the probe 131 so that light from the light emitter 112 can be reflected by the reflector 116 and towards the sensor 118 so that a holographic image can be generated.

Figure 8A:
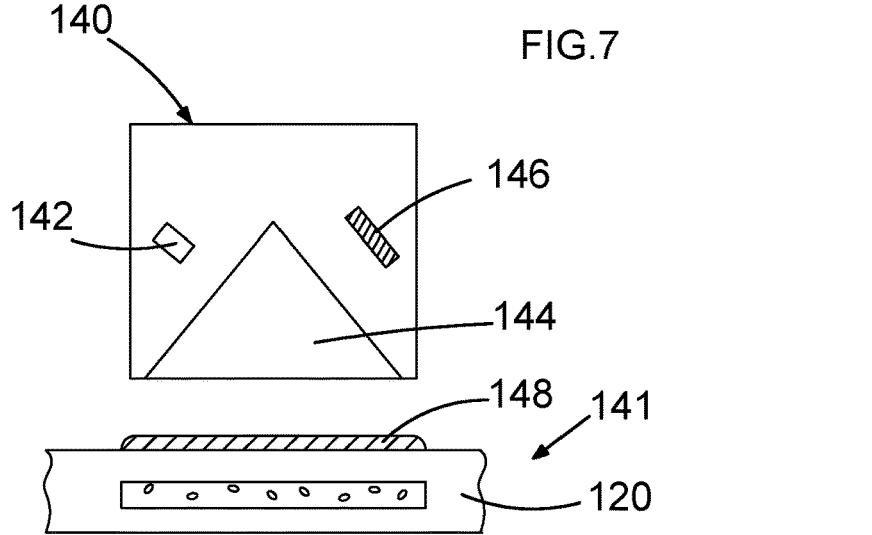
FIG. 8A is a schematic side view of another digital holographic microscope in another embodiment of the invention.
Figure 8B:
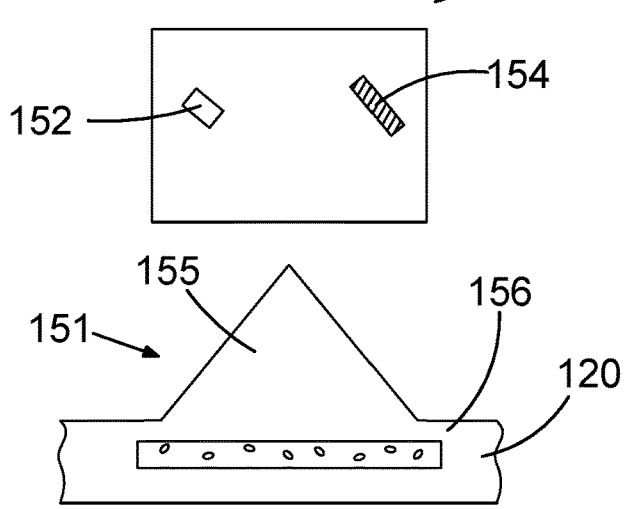
FIG. 8B is a schematic side view of another digital holographic microscope in another embodiment of the invention.

FIGS. 8A and 8B show alternative setups of the above digital holographic microscope arrangement. FIG. 8A is similar to FIG. 7, but shows a digital microscope 140 that is separated from the probe 141. The DHM 140 includes a light source 142, a prism 144 and a light sensor 146, where a surface of the prism 144 is connected and optically coupled to the probe 141 at a surface of the flowcell 120 by using an optical adhesive or immersion oil 148. Alternatively in FIG. 8B a prism 155 is included within a probe 151 as an upper surface of the flowcell 156. The digital microscope 150 includes a light source 152 and a light sensor 154. The light source 152 is oriented so that it emits light which encounters the prism 155 with a 90 degree angle of incidence. This means that light can be coupled into the prism 155 with a high efficiency. In this embodiment an optical adhesive is not required. The flowcells and/or probes in the above examples may be formed using injection moulding techniques.

Figure 9A:
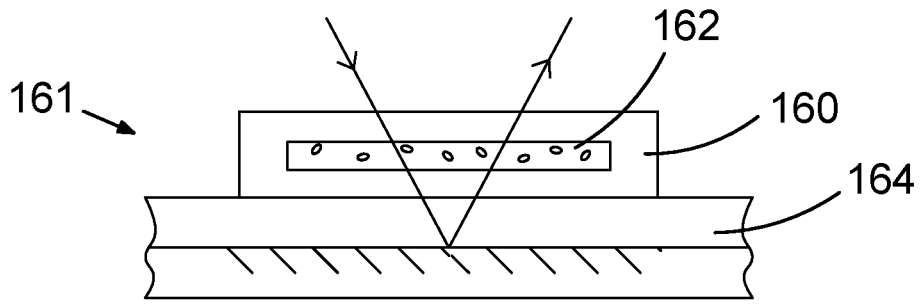
FIG. 9A is a schematic side view of another sample chamber in another embodiment of the invention.
Figure 9B:
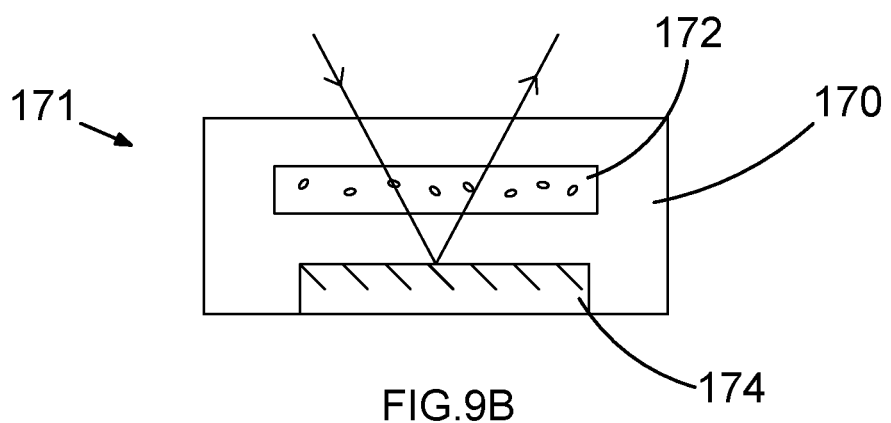
FIG. 9B is a schematic side view of another sample chamber in another embodiment of the invention.
Figure 9C:
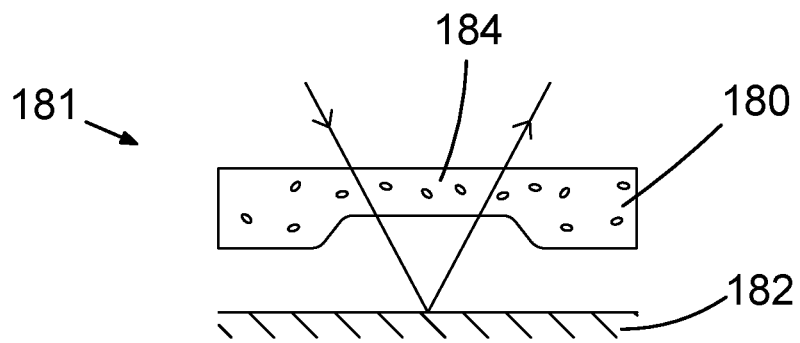
FIG. 9C is a schematic side view of another sample chamber in another embodiment of the invention.

FIGS. 9A, 9B and 9C show schematic views of different flowcell and reflector arrangements in probes 161, 171, 181 according to the invention. As described above it is desirable to provide a separation distance between the side of the flowcell channel (sample region) proximate to the reflector that is at least the width of the incident light beam. In FIG. 9A a flowcell 160 has a channel 162 provided within. A separate reflector component 164 is provided on a side of the flowcell 160 such that the reflector component 164 is configured to reflect incident light that has passed through the channel 162 back through the channel 162 at an angle. In FIG. 9B a flowcell 170 includes a channel 172 and a reflector 174 that is integrated within the flowcell 170. FIG. 9C shows a flowcell channel 182 and a reflector 182 where the channel 182 has a narrow section 184 through which incident and reflected light pass through. The sample can be imaged in the narrow section 184 to decrease the number of biological objects that are imaged at the same time. The arrangement in FIG. 9C can be implemented as a flowcell and reflector being separate components as in FIG. 9A or as a single integrated piece as in FIG. 9B.

Figure 10A:
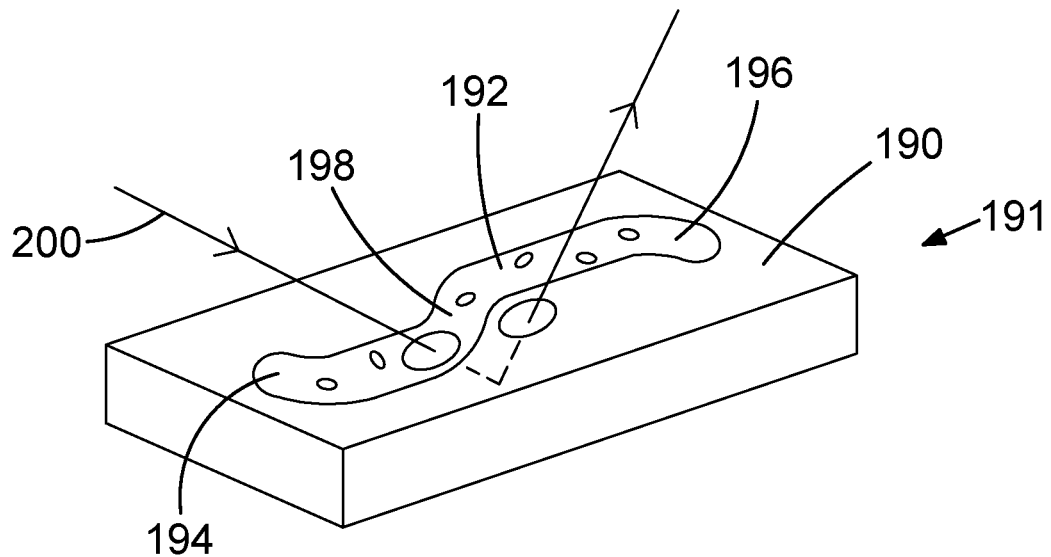
FIG. 10A is a schematic perspective view of another sample chamber for an in-line digital holographic microscope in another embodiment of the invention.
Figure 10B:
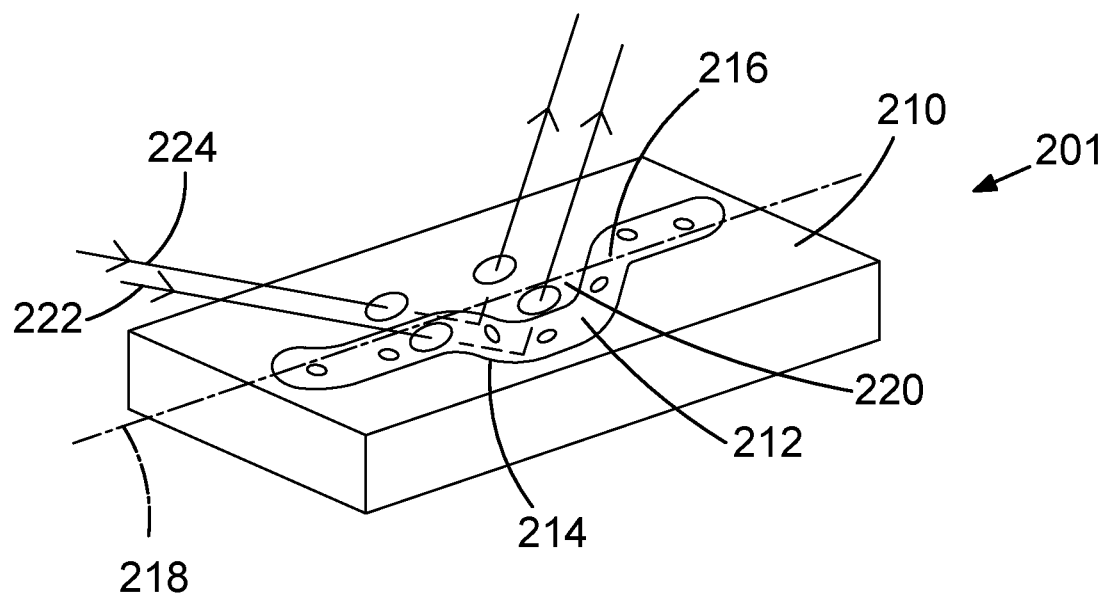
FIG. 10B is a schematic perspective view of another sample chamber for an off-axis digital holographic microscope in another embodiment of the invention.
Figure 10C:
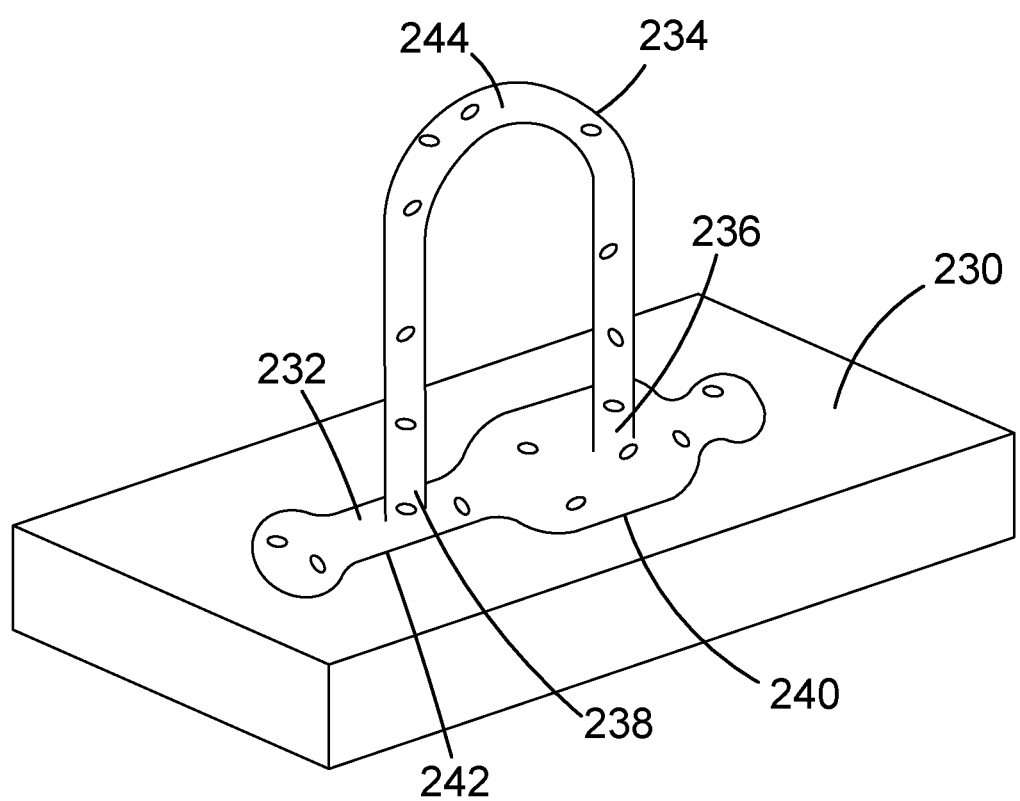
FIG. 10C is a schematic perspective view of another sample chamber with a secondary imaging loop, in addition to the main sample channel, for an in-line or off-axis holographic microscope in another embodiment of the invention.

FIGS. 10A, 10B and 10C show alternative flowcell arrangements within probes 191, 201 according to the invention. FIG. 10A shows a probe 191 comprising a flowcell 190 with a channel 192 between a flow entry point 194 and a flow exit point 196. The channel 192 has a bend or chicane 198 that causes the channel 192 to shift laterally along a width of the flowcell 190 such that light 200 enters the flowcell 190 at a section along the channel 192 and is reflected back out of the flowcell 190 away from the channel 192. This allows incident light to pass through the channel 192 only once (before the light is reflected in this example). This arrangement may be suitable in an in-line DHM setup.

FIG. 10B shows a probe 201 comprising a flowcell 210 with a channel 212 with a first bend 214 and a second bend 216. The first bend 214 is configured to direct the channel 212 away from a centre line 218 of the flow path between flow entry and exit points, and the second bend 216 is configured to return the channel 212 back toward the centre line 218. This double bend or chicane 214, 216 creates a solid section 220 in the flowcell 210 such that an incident object beam 222 is able to pass through a section of the channel 212 and be reflected out of the flowcell 210 through the solid section 220. By directing the first bend 214 away from the centre line 218 and the second bend 216 back toward the centre line 218 also allows an incident reference beam 224 (where the incident object beam 222 and the incident reference beam 224 may be different portions of the same light beam) to only pass through and be reflected back through sections of the flowcell 210 away from the channel 212. The flowcell arrangement in FIG. 10B therefore allows off-axis DHM to be performed. The probes 191, 201 include reflective surfaces which may be created by total internal reflection on the lower surface of the respective flowcell 190, 210.

FIG. 10C shows a flowcell 230 having a main channel 232 between flow entry and exit points. The flowcell 230 further comprises an imaging loop 234 that is fluidly connected to the main channel 232. The imaging loop 234 has an entry port 236 and a return port 238 where sample fluid is directed from the main channel 232 into the imaging loop 234 through the entry port 236 and returned back to the main channel 232 through the return port 238.

The main channel 232 also comprises a wider section 240 coincident with the entry port 236 of the imaging loop and a narrower section 242 coincident with the return port 238. The size difference between the wider section 240 and the narrower section 242 in the main channel 232 causes a higher pressure to form in the wider section than the narrower section such that sample fluid will flow through the imaging loop 234 as well as the main channel between entry and return ports 236, 238 of the imaging loop 234. The flow rate in the imaging region of the imaging loop 234 can be controlled by the relative cross-sectional areas of the wider and narrower regions 240, 242.

The imaged cell density and imaged cell speed can be controlled by the cross-sectional area and aspect ratio of the imaging loop in an imaging region 244 that is located toward the top of the imaging loop 234.

The imaging loop 234 is arranged substantially perpendicular or orthogonal to direction of flow in the main channel 232 such that in use the imaging loop 234 projects outwardly from the flowcell 230 away from a bioreactor or vessel to which the flowcell 230 is connected. The imaging region 244 of the imaging loop 234 can therefore be positioned within the path of an illumination beam of a digital holographic microscope. It should be appreciated that this arrangement removes the space restriction around a flowcell and therefore is compatible with a single-sided light source/light sensor DHM arrangement as well as a transmission-style DHM arrangement where the light source and light sensor are positioned on either side of a sample.

The invention claimed is:

1. An off-axis digital holographic microscope, comprising:
    a light emitter configured to provide a divergent light beam comprising a first portion and a second portion;
    a sensor positioned to receive the first portion of the divergent light beam from the light emitter in a first path and the second portion of the divergent light beam in a second path, and thereby to detect a holographic image;
    a reflector positioned partially in the divergent light beam so that the first portion of the divergent light beam that encounters the reflector is reflected towards the sensor in the first path, wherein the second portion of the divergent light beam that does not encounter the reflector extends directly from the light emitter to be incident on the sensor in the second path; and
    a support structure configured to support a sample in the first path or the second path.

2. The off-axis digital holographic microscope of claim 1, wherein the light emitter is a laser diode.

3. The off-axis digital holographic microscope of claim 2, wherein the reflector and the sensor are provided in the plane of the fast-axis of the laser diode.

4. The off-axis digital holographic microscope of claim 3, wherein the reflector is positioned within the full-width at half maximum of the divergent light beam.

5. The off-axis digital holographic microscope of claim 1, further comprising a transparent element with a refractive index that is greater than one and which is positioned in the first path or the second path to equalise the optical path lengths of the first and second paths.

6. The off-axis digital holographic microscope of claim 5, wherein at least one of the support structure and the reflector is provided in the transparent element.

7. The off-axis digital holographic microscope of claim 1, wherein the reflector reflects light towards the sensor in the first path by total internal reflection.

8. A method of performing digital holographic microscopy, comprising the steps of:
- emitting light from a light emitter to provide a divergent light beam comprising a first portion and a second portion;
- providing a reflector partially in the divergent light beam so that the first portion of the divergent light beam that encounters the reflector is reflected towards a sensor in a first path, wherein the second portion of the divergent light beam that does not encounter the reflector extends directly from the light emitter to be incident on the sensor in a second path;
- supporting a sample in a support structure in the first path or the second path; and
- receiving light at a sensor from the first path and the second path, and thereby detecting a holographic image.

* * * * *